(12) United States Patent
Lau (10) Patent No.: US 6,489,948 B1
(45) Date of Patent: Dec. 3, 2002

(54) COMPUTER MOUSE HAVING MULTIPLE CURSOR POSITIONING INPUTS AND METHOD OF OPERATION

(76) Inventor: Benny Chi Wah Lau, 7 Bronte Road, Thornhill, Ontario (CA), L3T 7H6

( * ) Notice: Subject to any disclaimer, the term of this patent is extended or adjusted under 35 U.S.C. 154(b) by 0 days.

(21) Appl. No.: 09/552,926

(22) Filed: Apr. 20, 2000

(51) Int. Cl.[7] .................................................. G09G 5/08
(52) U.S. Cl. ...................................... 345/163; 345/159
(58) Field of Search ................................. 345/156, 157, 345/158, 159, 160, 161, 162, 163, 164, 165, 166, 167, 168, 169, 170, 171, 172, 173, 856, 858

(56) References Cited

U.S. PATENT DOCUMENTS

| | | | |
|---|---|---|---|
| 4,891,632 A | * 1/1990 | Chang | 345/165 |
| 4,931,781 A | * 6/1990 | Miyakawa | 345/160 |
| 6,184,869 B1 | * 2/2001 | Harding et al. | 345/163 |

* cited by examiner

Primary Examiner—Lun-Yi Lao
Assistant Examiner—Tom V. Sheng
(74) Attorney, Agent, or Firm—Bruce Garlick (57) ABSTRACT

A mouse provides multiple cursor control input devices. A first input device is a tracking ball. The second input device may be a tracking ball, a finger pad, or a joy stick, among other input devices. The second input device provides a secondary control of cursor movement that is combined with the input of the first input device to provide full cursor control. In one embodiment, the second input is scaled by a scaling factor and then combined with the first input. In another embodiment, both the first input and the second input are scaled before they are combined. In another mouse, a single input is provided that is scaled by one of a plurality of scaling factors. The scaling factor may be altered to another one of the plurality of scaling factors via mouse input, for example a button input.

21 Claims, 6 Drawing Sheets

COMPUTER MOUSE HAVING MULTIPLE CURSOR POSITIONING INPUTS AND METHOD OF OPERATION

BACKGROUND

1. Technical Field

The present invention relates generally to digital computers; and more particularly to a mouse used to position a cursor on the display of a digital computer.

2. Related Art

Digital computers have been known in the art for years. Personal digital computers typically include a case, a video display, and one or more input/output devices. The case typically includes a power supply, a cooling fan, a motherboard, interface ports, peripheral cards, a disk drive, and other components. Contained on the motherboard are a processor, memory, a processor chip set, and one or more peripheral buses. The peripheral cards interface input/output devices with the motherboard via the peripheral buses. Other input/output devices may couple directly to the motherboard via appropriate connectors, e.g., devices coupled via a parallel port, devices coupled via a serial port, and devices coupled via a USB.

Generally speaking, input/output devices receive input from a user or another source and/or provide output to a user or anther source. Keyboards and computer mice are typically considered input devices because they receive input from a user but provide no output to the user. Typical monitors are considered output devices because they provide output to the user but receive no input from the user. Touch sensitive monitors however, do receive input from a user and are also considered an input device. Audio speakers are output devices while audio microphones are input devices.

A great difficulty in the design and operation of personal computers relates to user interfaces. Such is the case because the interaction of humans with computers is a primary purpose of computers. The keyboard has been the primary user input device since the advent of personal computers. The computer mouse has become a popular input device due to its ease of use. The mouse allows a user to position a cursor on the display by altering the physical position of the mouse. Typically, the mouse resides on a horizontal surface, such as a mouse pad resting on a desktop, and contacts the horizontal surface. A tracking ball contacts the mouse pad and, when the position of the mouse is altered, the tracking ball changes its orientation with respect to the mouse. Electronics contained in the mouse sense the change in orientation of the tracking ball within the mouse and translate this into electronic signals. These electronic signals are transmitted to the motherboard via an interface, processed by software executing on the computer and result in a change in position of the cursor on the display.

Additional input devices on the mouse, such as push buttons, allow for additional operations, such as item selection, text highlighting, and dragging/dropping, for example. A mouse wheel may also be included that allows a user to scroll the computer's display. With some mice, push buttons may be programmed to execute other functions as well, such as double click operations with a single button push.

Mice are designed to accommodate the range of motion of a user's arm and/or wrist. The user's arm and/or wrist provide a relatively large range of motion. To provide full screen cursor control, mice are designed so that a reasonable range of motion of the mouse provides full-screen cursor movement. However, this design makes fine cursor movement difficult. While fine cursor positioning is available by programming the mouse to have a lesser range of operation, the benefit of full screen cursor movement is defeated with these settings. Further, most users cannot provide fine levels of input with their arm/or wrist. Thus, it is difficult for most users to control the fine motion of a cursor using a mouse.

Thus, there is a need in the art for a mouse that provides full-screen cursor movement but at the same time allows for fine positioning of the cursor.

SUMMARY OF THE INVENTION

Thus, to overcome the shortcomings of the prior systems, among other shortcomings, a mouse constructed according to the present invention provides multiple cursor control input devices. A first input device is the traditional tracking ball input that operates when the position of the mouse is altered with respect to a surface upon which it resides. A second input device resides upon a surface of the mouse that is accessible with one or more of the user's fingers. This second input device may be a tracking ball, a finger pad, or a joy stick, among other input devices. This second input device provides a secondary control of cursor movement that is combined with the input of the first input device to provide full cursor control.

In a described operation, the first input device provides coarse cursor control while the second input device provides fine cursor control. This configuration compliments the motor control available with a user's hand and fingers. The user's hand/wrist has coarser motor control than does the user's fingers. Thus, the first input device is operated by motion of the user's hand or wrist and provides coarse positioning of the cursor. Further, the second input device is operated by one or more fingers of the user and provides fine cursor positioning. Thus, while the first input device corresponds to the coarse motor control of the user's hand/wrist in positioning the cursor, the second input device corresponds to the fine motor control of the user's fingers in finely positioning the cursor.

In another embodiment of the present invention, the user provides input only via the first input device. However, a button on the mouse (or other toggling mechanism) adjusts the gain or scaling of the first input device between a coarser positioning and a finer positioning. In this fashion, the user may coarsely position the cursor on the display using the coarser setting, adjust the scaling of the input device, and finely position the cursor on the display using the finer setting.

Moreover, other aspects of the present invention will become apparent with further reference to the drawings and specification, which follow.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE DRAWINGS

Figure 1A:
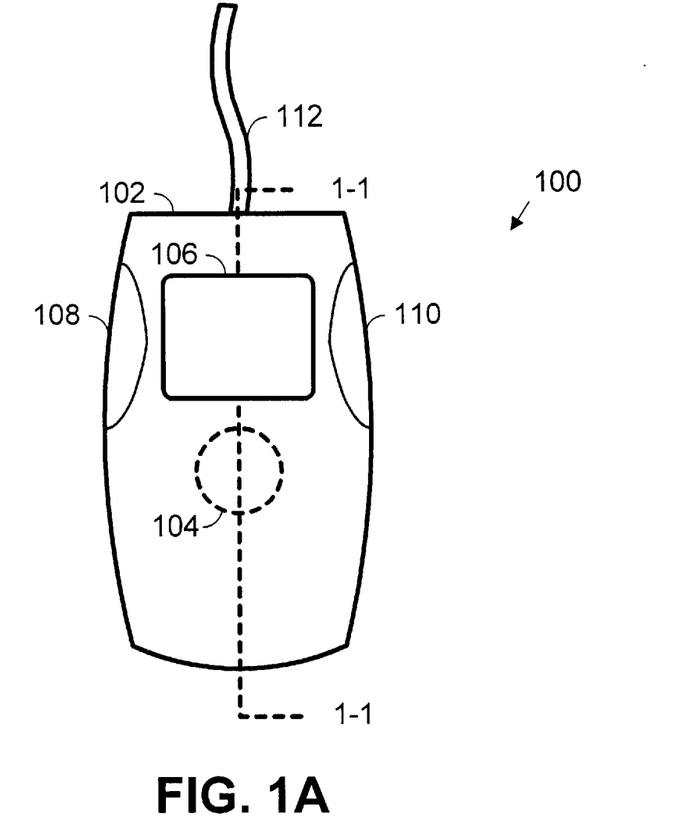
FIG. 1A is a diagrammatic top view of a first embodiment of a computer mouse constructed according to the present invention.

FIG. 1A is a diagrammatic top view of a first embodiment of a computer mouse 100 constructed according to the present invention. The computer mouse 100 includes a shell 102 constructed of plastic or another sturdy material that may be formed in the desired fashion. The shape of the shell 102 is shown in FIG. 1A as an example of a contemplated embodiment and should not be construed to limit the scope of the present invention.

Various user input devices extend from the shell 102 of the mouse 100. A tracking ball 104 extends from a lower surface of the shell 102 such that it contacts a horizontal surface upon which the mouse 100 operates. As will be described further with respect to FIG. 1B, the tracking ball 104 is coupled to transducers which translate the motion of the tracking ball 104 into electronic signals. These electronic signals are converted to produce the first input. The first input is then interpreted to cause the movement of a cursor on a computer display. In this case, the tracking ball 104 serves as a first input device for the user.

A touch pad 106 serves as a second input device and receives touch inputs from the user via a user's finger to produce a second input. The touch inputs from the user's finger serves to further position the cursor on the display. However, the resolution of such cursor positioning is finer than for the first input device, the tracking ball 104. As will be further described, scaling factors are applied to the first input and/or the second input to adjust the resolution that is obtained from each input device.

The touch pad 106 not only receives positional information based upon the movement of the user's finger on the touch pad 106 but can receive other inputs as well. For example, the tapping of a finger on the touch pad 106 may be interpreted as a click/selection of an element on the display to which the cursor location corresponds. Further, double tapping of a finger on the touch pad 106 may be interpreted as a double click/selection of an element on the display to which the cursor location corresponds.

The mouse 100 may include additional input devices as well, such as buttons 108 and 110. These buttons 108 and 110 may serve to select display elements that correspond to the location of the cursor on the display. Examples of elements on a computer display include shortcuts to computer programs, web page links, text selections, pull down menus, and formatting options, among other elements. These elements may also be accessed via the touch pad 106. These buttons 108 and 110 may also serve to enable mouse operations, to disable mouse operations, and to adjust mouse input scaling factors, among other operations The first input produced by the first input device tracking ball 104) and the second input produced by the second input device (touch pad 106) are coupled to the computer via a wired connection 112. However, in another embodiment, the connection to the computer may be accomplished via a wireless connection. Further, in either case, the first input and the second input may be combined into a composite input prior to its transmission to the computer.

Figure 1B:
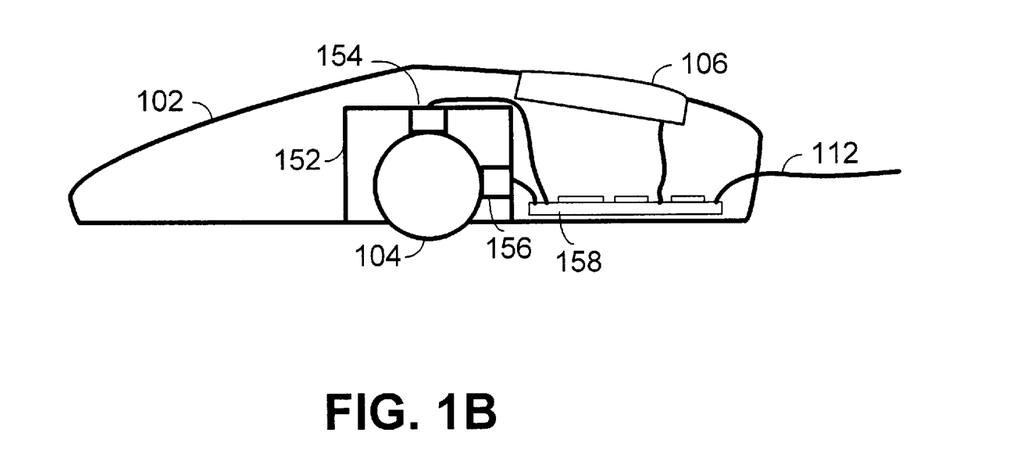
FIG. 1B is a diagrammatic sectional side view taken along line 1—1 of a first embodiment of a computer mouse constructed according to the present invention.

FIG. 1B is a diagrammatic sectional side view taken along line 1—1 of the first embodiment of the computer mouse of FIG. 1A. As is shown, the tracking ball 104 resides substantially within the mouse shell 102 and contacts transducers 154 and 156 contained within a tracking ball enclosure 152. These transducers 154 and 156 couple to a printed circuit board 158 or other circuitry that translates the transducer 154 and 156 inputs into the first input. The touch pad 106 also couples to the printed circuit board 158, which translates the received input from the touch pad 106 into the second input.

Figure 2A:
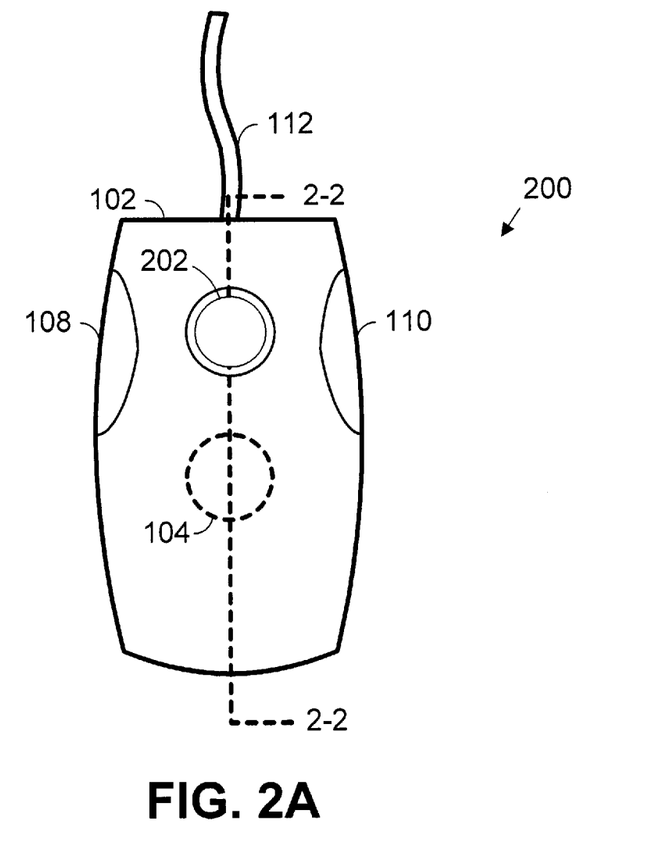
FIG. 2A is a diagrammatic top view of a second embodiment of a computer mouse constructed according to the present invention.
Figure 2B:
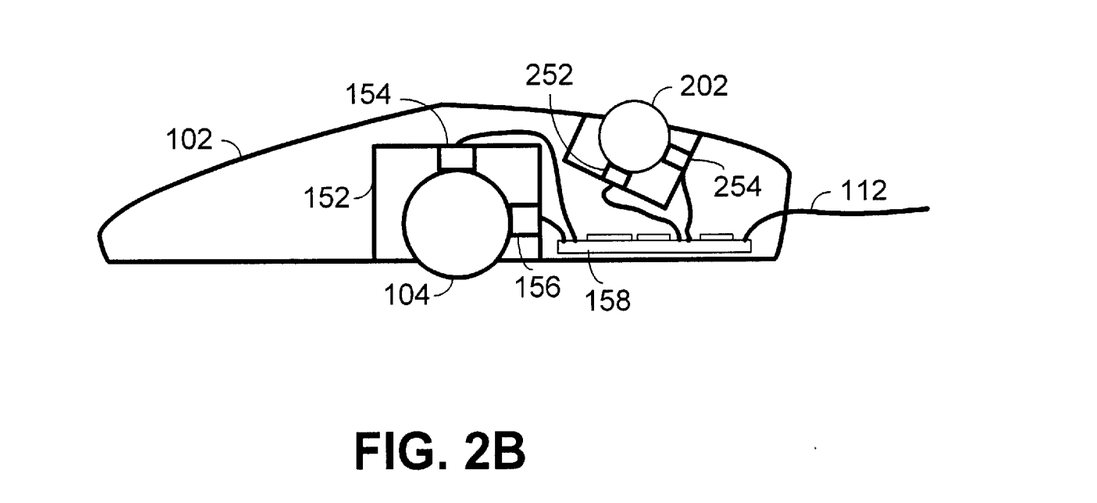
FIG. 2B is a diagrammatic sectional side view taken along line 2—2 of a second embodiment of a computer mouse constructed according to the present invention.

FIG. 2A is a diagrammatic top view of a second embodiment of a computer mouse 200 constructed according to the present invention. FIG. 2B is a diagrammatic sectional side view taken along line 2—2 of a second embodiment of the computer mouse 200. The structure of FIGS. 2A and 2B is the same as that of FIGS. 1A and 1B, respectively, except for those differences described. Thus, for the common elements between FIGS. 1A, 1B, 2A, and 2B, common numbering has been retained.

As compared to the computer mouse 100 of FIGS. 1A and 1B, the computer mouse 200 of FIGS. 2A and 2B includes, as a second input device, a second tracking ball 202. The tracking ball 202 couples to transducers 252 and 254, which translate movement of the second tracking ball 202 into electrical signals. These electrical signals produced by the transducers 252 and 254 are coupled to the circuit board 158, which combines the electrical signals to form the second input. The circuit board 158 may combine the second input with the first input constructed from electrical signals received from the tracking ball transducers 154 and 156 and relay the combined result to the computer via wired connection 112. Alternately, the circuit board 158 may relay both the first input and the second input to the computer via the wired connection 112. In this case, the computer combines the first input and the second input via appropriate scaling factors.

Figure 3A:
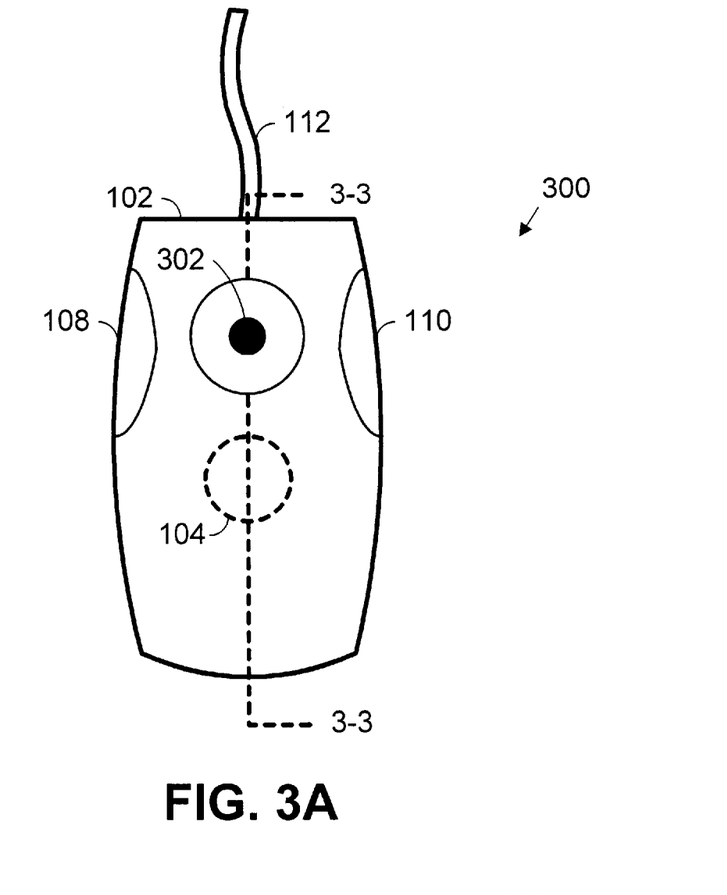
FIG. 3A is a diagrammatic top view of a third embodiment of a computer mouse constructed according to the present invention.
Figure 3B:
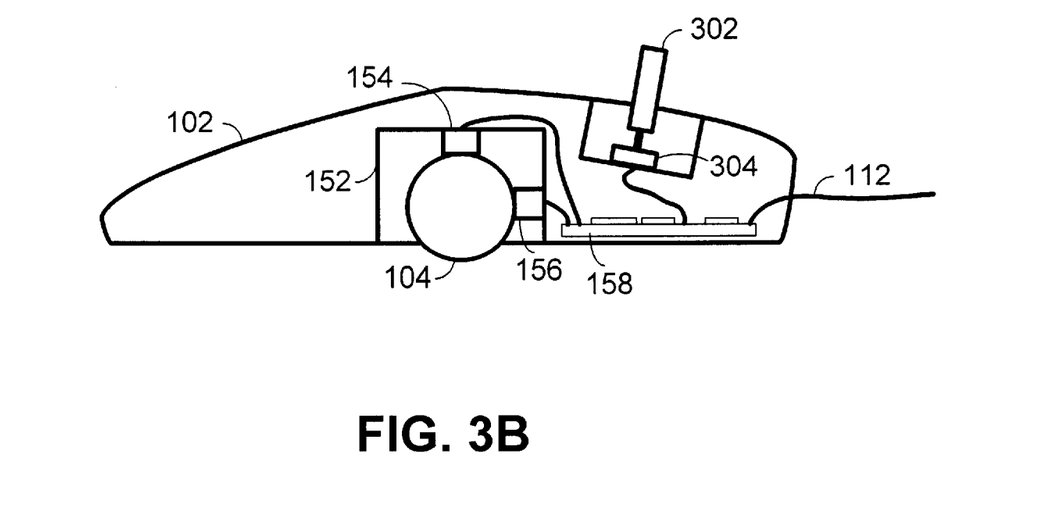
FIG. 3B is a diagrammatic sectional side view taken along line 3—3 of a third embodiment of a computer mouse constructed according to the present invention.

FIG. 3A is a diagrammatic top view of a third embodiment of a computer mouse 300 constructed according to the present invention. FIG. 3B is a diagrammatic sectional side view taken along line 3—3 of the third embodiment of the computer mouse 300. The structure of FIGS. 3A and 3B is the same as that of FIGS. 1A, 1B, 2A and 2B, except for those differences 25 described. Thus, for the common elements between FIGS. 1A, 1B, 2A, 2B, 3A and 3B, common numbering has been retained.

As compared to the computer mouse 100 of FIGS. 1A and 1B, and the computer mouse 200 of FIGS. 2A and 2B, the computer mouse 300 of FIGS. 3A and 3B includes, as a second input device, a joy stick 302. The joy stick 302 couples to transducer 304, which translates movement of the joy stick 302 into electrical signals. These electrical signals produced by the transducer 304 are coupled to the circuit board 158, which converts the electrical signals to form the second input. The circuit board 158 may combine the second input with the first input constructed from electrical signals received from the tracking ball transducers 154 and 156 and relay the combined result to the computer via wired connection 112. Alternately, the circuit board 158 may relay both the first input and the second input to the computer via the wired connection 112. In this case, the computer combines the first input and the second input via appropriate scaling factors.

Figure 4A:
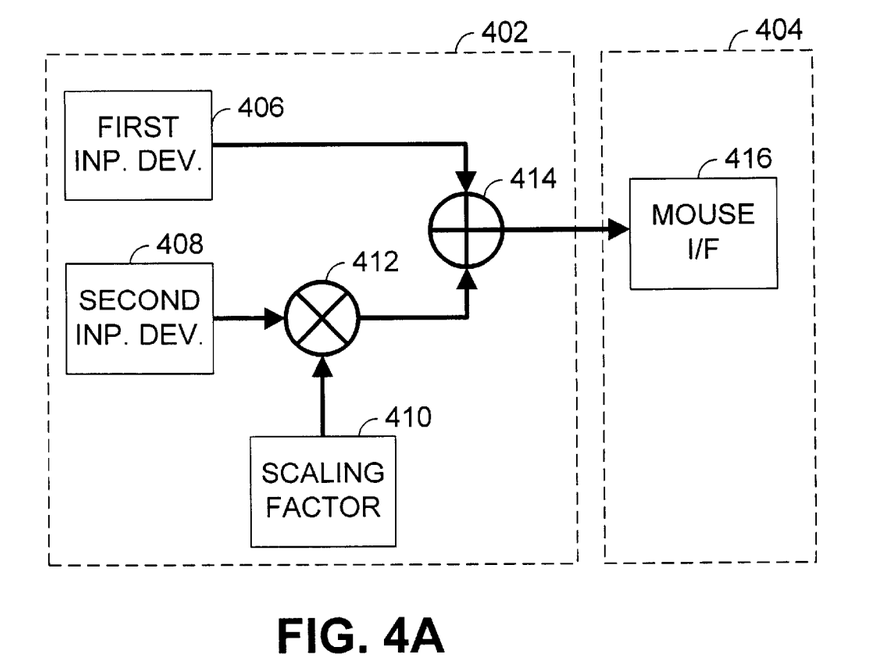
FIG. 4A is a block diagram illustrating a construction according to the present invention in which hardware in the mouse sums input from the first input device and the second input device.

FIG. 4A is a block diagram illustrating a construction according to the present invention in which hardware in the mouse 402 sums the first input from the first input device 406 and the second input from the second input device 408. In the embodiment of FIG. 4A, circuitry in the mouse 402 includes scaling circuitry 412, which scales the second input from the second input device 408 by a scaling factor 410.

The scaling factor may be adjusted via user input. The adjustment may be performed by software operation and/or hardware operation. The circuitry in the mouse 402 then adds the scaled second input to the first input using adding circuitry 414. The combined input is then provided to the computer 404 via a mouse interface 416. The scaling circuitry 412 and the adding circuitry 414 may be specialized hardware or generalized hardware that has been programmed to perform the specific functions.

Figure 4B:
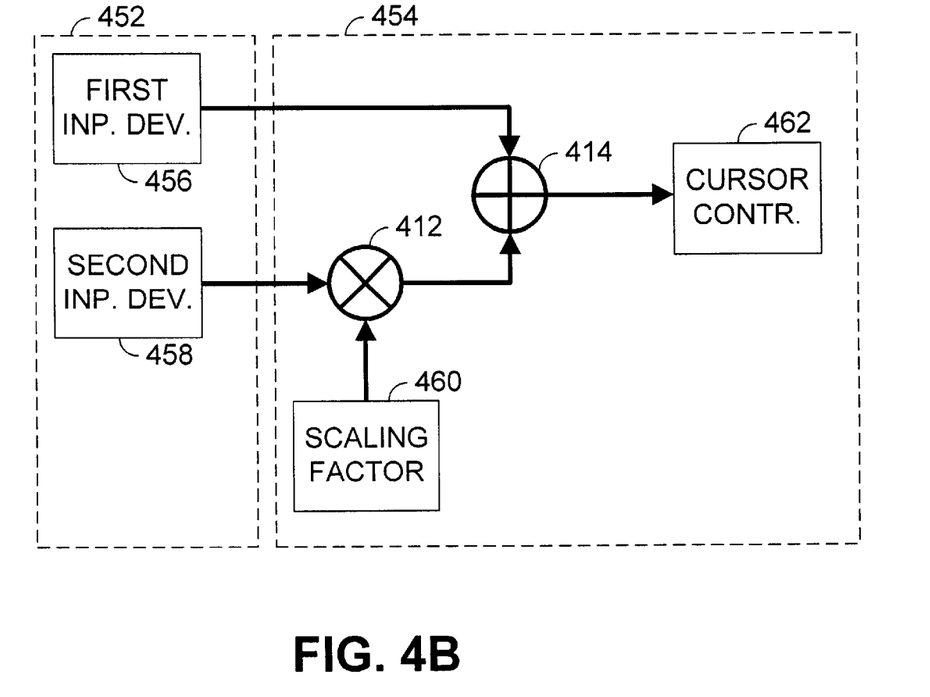
FIG. 4B is a block diagram illustrating a construction according to the present invention in which a software driver sums which input from the first input device and the second input device.

FIG. 4B is a block diagram illustrating a construction according to the present invention in which a software driver 462 sums the first input from the first input device 456 and the second input from the second input device 458. In the embodiment of FIG. 4B, circuitry in the mouse 452 simply passes the first input and the second input to the computer 454. The computer 454, via a mouse interface and a mouse driver, receives the first input and the second input. The mouse driver scales the second input by a scaling factor 460.

The scaling factor may be adjusted via user input. The adjustment may be performed by software operation and/or hardware operation. The mouse drive then adds the scaled second input to the first input using an addition operation 414. The mouse driver then passes the combined input to cursor control software 462. In an alternate construction, hardware on the mouse interface card may perform the scaling and adding operations.

Figure 5A:
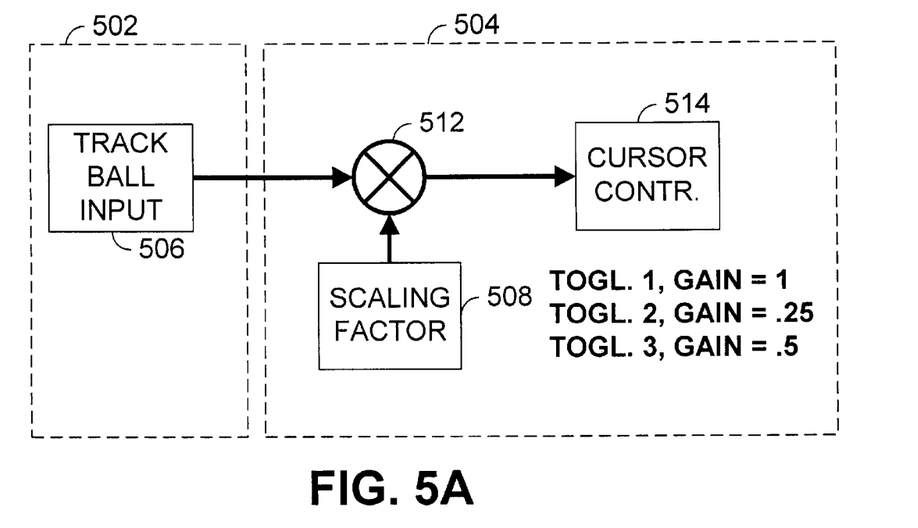
FIG. 5A is a block diagram illustrating a construction according to the present invention in which the scaling of an input may be adjusted from coarser to finer settings.

FIG. 5A is a block diagram illustrating a construction according to the present invention in which the scaling of an input may be adjusted from coarser to finer settings. In the description of FIG. 5A, the input device is considered to be a tracking ball input 506 produced by a tracking ball structure 502. However, the principles of FIG. 5A may be easily applied to a touch pad, a joy stick, a finger operated tracking ball, or other devices which produce an input having two dimensional motion represented thereby.

A gain scaling block 504 receives the tracking ball input 506 and scales the tracking ball input 506 by a gain scaling factor 508 via scaling element 512. According to the teachings of FIG. 5A, however, the scaling factor, is one of a plurality of discrete scaling factors. One of these scaling factors is selected via another mouse input device, e.g., a push button, a switch, or another mouse input device. The output produced by the scaling element 512 that is provided to a cursor control interface 514 is therefore scaled by the appropriate scaling factor.

By applying one of a plurality of scaling factors via a simple scaling factor adjustment, a user may use a greater scaling factor when greater cursor movement is required and a lesser scaling factor when finer cursor control is desired. Because this scaling factor is easily adjusted via mouse input, access of a software drive via more complex interaction is not required.

Figure 5B:
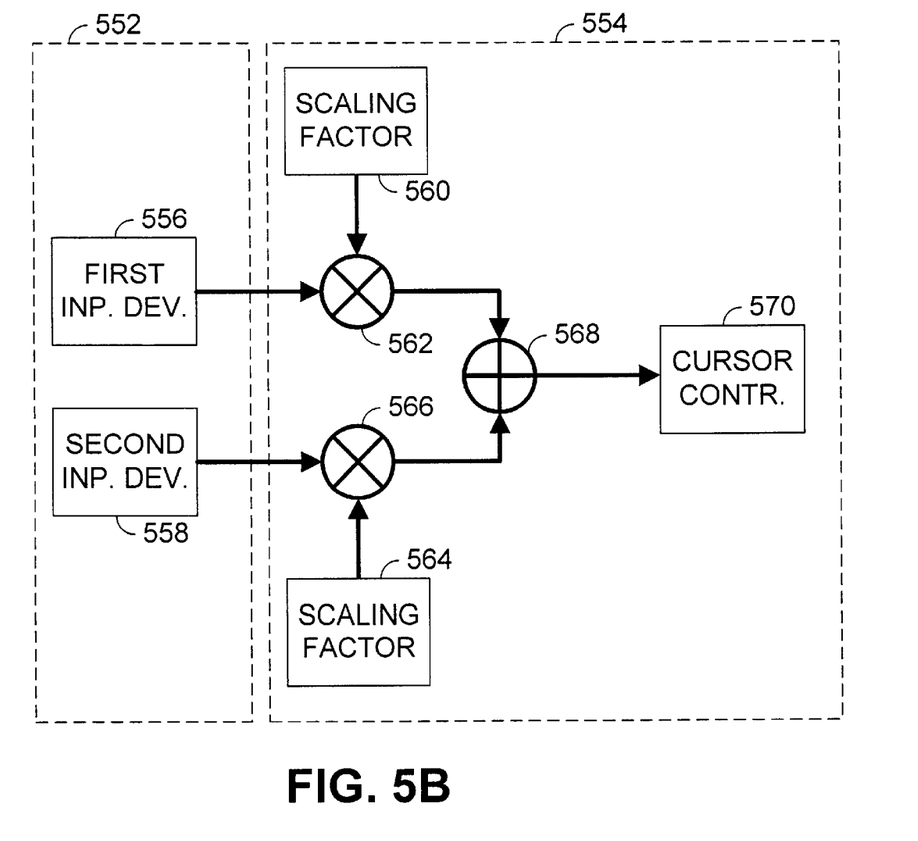
FIG. 5B is a block diagram illustrating a construction according to the present invention in which inputs from a first input device and a second input device are both scaled prior to being summed by a software driver.

FIG. 5B is a block diagram illustrating a construction according to the present invention in which mouse 552 inputs from a first input device 556 and a second input device 558 are both scaled prior to being summed by a software driver 554. The mouse 552 includes both the first input device 556 and the second input device 558 and provides both a first input produced by the first input device 556 and a second input provided by the second input device 558 to the software driver 554. The software driver 554 uses a scaling operation 562 to scale the first input by a first scaling factor 560. Likewise, the software driver 554 uses a scaling operation 566 to scale the second input by a second scaling factor 564. The software driver 554 combines the output from the first scaling operation 562 and the output from the second scaling operation 566 in an adding operation 568, the output of which is provided to a cursor control operation 570.

Figure 6:
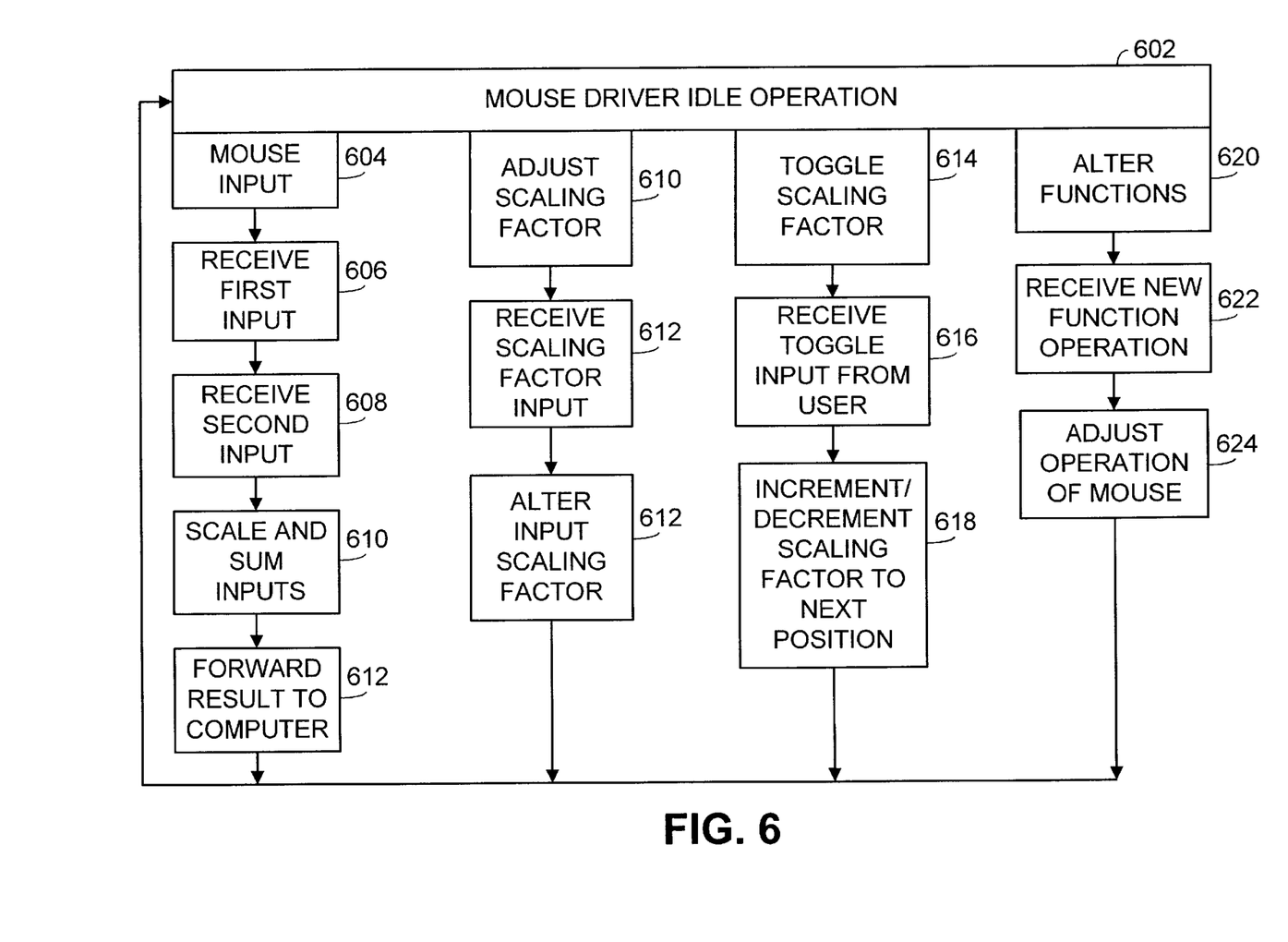
FIG. 6 is a logic diagram illustrating operation according to the present invention.

FIG. 6 is a logic diagram illustrating operation according to the present invention. The operations of FIG. 6 are described with reference to a mouse driver. However, some of these operations may also be performed by hardware resident in a computer mouse and/or in a mouse interface. Operation of the mouse remains in an idle operation (step 602) until the various operations described herein occur. Of course, the mouse may perform other operations that are not described with reference to FIG. 6.

As a first operation, the mouse receives cursor control input from a user (step 604). When this occurs, the mouse driver receives a first input from a first input device (step 606). The mouse driver also receives a second input from a second input device (step 608). The mouse driver then sums and scales the first input and the second input (step 610). These scaling and summing operations are consistent with those described with reference to FIGS. 4A, 4B, 5A and 5B. Finally, the mouse driver forwards the result to the computer for cursor control operation (step 612). From step 612, operation returns to step 602.

At step 614, the user toggles the scaling factor for one of the input devices. For example, FIG. 5A discloses toggling of the scaling factor of an input device among a plurality of discrete scaling factors. When, such toggling operation is initiated, the mouse driver receives the toggle input from the user (step 616). In response, the mouse driver increments the scaling factor to the next higher scaling position (step 618). In an alternate operation, the mouse driver decrements the scaling factor to the next lesser scaling position. From step 618, operation returns to step 602.

Finally, the mouse driver supports altering functions of the mouse (step 620). Such functions may include whether an input is scaled, whether an input scaling factor may be toggled, whether multiple inputs are used for cursor control, the operation provided by a mouse button, among other functions. The mouse driver receives the new function operation (step 622) and adjusts the operation of the mouse accordingly (step 624). From step 624, operation returns to step 602.

The invention disclosed herein is susceptible to various modifications and alternative forms. Specific embodiments therefor have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A computer mouse comprising:

a mouse shell having a top portion and a bottom portion, wherein the top portion includes an anterior portion and a posterior portion;

a first cursor positioning input device that controls the positioning of a two-dimensional cursor in a two-dimensional screen area wherein the first cursor positioning input device produces a first input in response to motion of the mouse shell relative to a stationary reference;

a second cursor positioning input device substantially centrally located on the anterior portion of the top portion of the mouse shell and that controls the positioning of the two-dimensional cursor in the two-dimensional screen area and wherein the second cursor positioning input device produces a second input in response to motion of the second cursor positioning input device relative to the mouse shell; and circuitry operably coupled to the first cursor positioning input, the second cursor positioning input, and a coupled computer, wherein the circuitry scales the second input by a scaling factor to produce a scaled second put, wherein the circuitry combines the scaled second input with the first input to produce a composite output, and wherein the circuitry provides the composite output to the coupled computer for two-dimensional cursor positioning in the two-dimensional screen area.

2. The computer mouse of claim 1, wherein the scaling factor is selected such that user input to the first cursor positioning input device produces coarse two-dimensional cursor positioning and user to the second cursor positioning input produces fine two-dimensional cursor positioning.

3. The computer mouse of claim 1, wherein the first cursor positioning input device is a tracking ball.

4. The computer mouse of claim 1, wherein the second cursor positioning input device is a tracking ball.

5. The computer mouse of claim 1, wherein the second cursor positioning input device is a touch pad.

6. The computer mouse of claim 1, wherein the second cursor positioning input device is a joystick.

7. The computer mouse of claim 5, wherein the touch pad is centrally located on the anterior portion of the top portion of the mouse shell.

8. The computer mouse of claim 1, wherein the composite output is provided to the coupled computer in a standardized format such that it is indistinguishable from a signal provided to the coupled computer from a mouse having a single two-dimensional cursor positioning input.

9. The computer mouse of claim 1, wherein the scaling factor is one of a plurality of scaling factors.

10. The computer mouse of claim 9, wherein:

the mouse further comprises a toggle input; and a toggling of the toggle input causes the scaling factor to be altered from a first scaling factor of the plurality of scaling factors to a second scaling factor of the plurality of scaling factors.

11. A computer mouse comprising:

a mouse shell having a top portion and a bottom portion, wherein the top portion includes an anterior portion and a postror portion;

a first cursor positioning input device that controls the positioning of a two-dimensional cursor in a two-dimensional screen area, when the first cursor positioning input device produces a first input in response to motion of the mouse shell relative to a stationary reference;

a touch pad that is substantially centrally located on the anterior portion of the top portion of the mouse shell and that controls the positioning of the two-dimensional cursor in the two-dimensional screen area, wherein the touch pad is readily accessible to an index finger of a user of the mouse when the user's palm resides upon the anterior portion of the mouse shell, and wherein the touch pad produces a second input in response to motive touch having motion relative to the mouse shell;

circuitry operably coupled to the first cursor positioning input, the touch pad, and a coupled computer, wherein the circuitry scales the second input by a scaling factor to produce a said second input, wherein the circuitry combines the scaled second input with the first input to produce a composite output, and wherein the circuitry provides the composite output to the coupled computer for two-dimensional cursor positioning in the two-dimensional screen area; and wherein the scaling factor is selected such that user input to the first cursor positioning input device produces coarse two-dimensional cursor positioning and user to the second cursor positioning input produces fine two-dimensional cursor positioning.

12. The computer mouse of claim 11, wherein the first cursor positioning input device is a tracking ball.

13. The computer mouse of claim 11, wherein the composite output is provided to the coupled computer in a standardized format such that it is indistinguishable from a signal provided to the coupled computer from a mouse having a single two-dimensional cursor positioning input.

14. The computer mouse of claim 11, wherein the scaling factor is one of a plurality of scaling factors.

15. The computer mouse of claim 14, wherein:

the mouse further comprises a toggle input; and a toggling of the toggle input causes the scaling factor to be altered from a first scaling factor of the plurality of scaling factors to a second scaling factor of the plurality of scaling factors.

16. A computer mouse comprising:

a mouse shell having a top portion and a bottom portion, wherein the top portion includes an anterior portion and a posterior portion;

a first cursor positioning input device that controls the positioning of a two-dimensional cursor in a two-dimensional screen area, wherein the first cursor positioning input device produces a first input in response to motion of the mouse shell relative to a stationary reference;

a touch pad that is substantially centrally located on the anterior portion of he top portion of the mouse shell and that controls the positioning of the two-dimensional cursor in the two-dimensional screen area, wherein the touch pad is readily accessible to an index finger of a user of the mouse when the user's palm resides upon the anterior portion of the mouse shell, and wherein the touch pad produces a second input in response to notive touch having motion relative to the mouse shell;

circuitry operably coupled to the first cursor positioning input, the touch pad, and a coupled computer, wherein the circuitry scales the second input by a scaling factor to produce a scaled second input, wherein the circuitry combines the scaled second input with the first input to produce a composite output, and wherein the circuitry provides the composite output to the coupled computer for two-dimensional cursor positioning in the two-dimensional screen area;

wherein the scaling factor is selected such that user input to the first cursor positioning input device produces coarse two-dimensional cursor positioning and user to the second cursor positioning input produces fine two-dimensional cursor positioning; and wherein the scaling factor may be chosen from a plurality of possible scaling factors.

17. The computer mouse of claim 16, wherein the first cursor positioning input device is a tracking ball.

18. The computer mouse of claim 16, wherein the composite output is provided to the coupled computer in a standardized format such that it is indistinguishable from a signal provided to the coupled computer from a mouse having a single two-dimensional cursor positioning input.

19. The computer mouse of claim 16, wherein:

the mouse further comprises a toggle input; and a toggling of the toggle input causes the scaling factor to be altered from a first scaling factor of the plurality of scaling factors to a second scaling factor of the plurality of scaling factors.

20. A computer mouse comprising:

a mouse shell having a top portion and a bottom portion, wherein the top portion includes an anterior portion and a posterior portion;

a first cursor positioning input device that controls the positioning of a two-dimensional cursor in a two-dimensional screen area wherein the first cursor positioning input device produces a first input in response to motion of the mouse shell relative to a stationary reference;

a touch pad that is substantially centrally located on the anterior portion of the top portion of the mouse shell and that controls the positioning of the two-dimensional cursor in the two-dimensional screen area, wherein the touch pad is readily accessible to all index finger of a user of the mouse when the user's palm resides upon the anterior portion of the mouse shell, and wherein the touch pad produces a second input in response to motive touch having motion relative to the mouse shell;

circuitry operably coupled to the fist cursor positioning input, the touch pad, and a coupled computer, wherein the circuitry scales the second input by a scaling factor to produce a scaled second input, wherein the circuitry combines the scaled second input with the first input to produce a composite output and when the circuitry provides the composite output to the coupled computer for two-dimensional cursor positioning in the two-dimensional screen area;

wherein the scaling factor is selected such that user input to the first cursor positioning input device produces coarse two-dimensional cursor positioning and user to the second cursor position input produces fine two-dimensional cursor positioning;

wherein the scaling factor may be chosen from a plurality of scaling factors; and wherein the composite output is provided to the coupled computer in a standardized format such that it is indistinguishable from a signal provided to the coupled computer from a mouse having a singe two-dimensional cursor positioning input.

21. The computer mouse of claim 20, wherein:

the mouse further comprises a toggle input; and a toggling of the toggle input causes the scaling factor to be altered from a first scaling factor of the plurality of scaling factor of the plurality of scaling factors.

* * * * *